United States Patent
Condini et al.

(10) Patent No.: US 10,721,796 B2
(45) Date of Patent: Jul. 21, 2020

(54) METHOD FOR CONTROLLING A HEAT SOURCE BELONGING TO A COOKING APPARATUS AND COOKING APPARATUS CONFIGURED TO CARRY OUT SAID METHOD

(71) Applicant: Alessandro Condini, Trento (IT)

(72) Inventors: Alessandro Condini, Trento (IT); Jasmina Kaluderovic, Tenna (IT)

(73) Assignee: Alessandro Condini, Trento (IT)

( * ) Notice: Subject to any disclaimer, the term of this patent is extended or adjusted under 35 U.S.C. 154(b) by 269 days.

(21) Appl. No.: 15/766,911

(22) PCT Filed: Oct. 13, 2016

(86) PCT No.: PCT/IB2016/056121
§ 371 (c)(1),
(2) Date: Apr. 9, 2018

(87) PCT Pub. No.: WO2017/064636
PCT Pub. Date: Apr. 20, 2017

(65) Prior Publication Data
US 2018/0295677 A1 Oct. 11, 2018

(30) Foreign Application Priority Data
Oct. 14, 2015 (IT) .......................... 102015000061472

(51) Int. Cl.
*H05B 6/12* (2006.01)
*H05B 6/06* (2006.01)
(Continued)

(52) U.S. Cl.
CPC ........... *H05B 6/062* (2013.01); *H05B 6/1218* (2013.01); *A47J 27/002* (2013.01); *A47J 27/004* (2013.01); *H05B 2213/07* (2013.01)

(58) Field of Classification Search
CPC .... H05B 6/062; H05B 6/1209; H05B 6/1218; H05B 2213/07; H05B 3/74; H05B 3/746; A47J 27/002; A47J 27/004
(Continued)

(56) References Cited

U.S. PATENT DOCUMENTS

| 5,227,610 | A | | 7/1993 | Schultheis et al. |
| 6,118,105 | A | * | 9/2000 | Berkcan ............... H05B 1/0266 219/449.1 |

(Continued)

FOREIGN PATENT DOCUMENTS

| DE | 7315318 | | 7/1973 | |
| EP | 1615469 A2 | * | 1/2006 | ............. H05B 3/746 |
| JP | 2009-211984 A | | 9/2009 | |

OTHER PUBLICATIONS

International Search Report and Written Opinion dated Jan. 30, 2017, issued in PCT Application No. PCT/IB2016/056121 filed Oct. 13, 2016.

*Primary Examiner* — Hung D Nguyen
(74) *Attorney, Agent, or Firm* — Workman Nydegger (57) ABSTRACT

A method for controlling the intensity of heat delivered by at least one heat source belonging to a cooking apparatus provided with a hob, wherein the heat source is arranged underneath a circumscribed cooking area of the hob. The method provides for the steps of calculating over time the change in the difference between the temperatures detected at a first point $P_1$ and at a second point $P_2$ of the hob and involves reducing the intensity of heat delivered by the heat source if the change exceeds a predetermined maximum threshold $\Delta^2 T_{max}$.

12 Claims, 5 Drawing Sheets

(51) Int. Cl.
*H05B 6/08* (2006.01)
*A47J 27/00* (2006.01)

(58) Field of Classification Search
USPC ....... 219/620, 621, 622, 624, 625, 627, 628,
219/660, 661, 662, 663, 667, 671, 675,
219/676, 446.1, 448.11, 448.12, 448.14,
219/448.15, 448.16, 448.17, 448.18
See application file for complete search history.

(56) References Cited

U.S. PATENT DOCUMENTS

2003/0206572 A1* 11/2003 Dorwarth .............. H05B 3/746
374/121
2009/0010302 A1 1/2009 Wilde et al.

* cited by examiner

METHOD FOR CONTROLLING A HEAT SOURCE BELONGING TO A COOKING APPARATUS AND COOKING APPARATUS CONFIGURED TO CARRY OUT SAID METHOD

BACKGROUND OF THE INVENTION

1. The Field of the Invention

The invention relates to a method for controlling the intensity of heat delivered by at least one heat source belonging to a cooking apparatus provided with a hob.

2. The Relevant Technology

The invention also relates to a cooking apparatus configured to carry out the above method of controlling a heat source.

Cooking apparatuses are known, provided with one or more heat sources arranged underneath a hob, usually made of glass-ceramic material.

As regards the heat sources currently used in cooking apparatuses, they comprise gas burners, electric heaters or induction coils.

On the other hand, as regards the expression "hob", it should be noted that, hereinafter, it will be used to denote the portion of the kitchen top, or also known as kitchen worktop, used for cooking food. Clearly, "kitchen top" means the entire horizontal space defined in a kitchen.

It is also known that the glass-ceramic material of which the above hobs are made is characterized by high resistance to high temperatures, up to maximum values which are around 7-800° C.

Moreover, these materials are able to effectively withstand the so-called "thermal stresses", also known as "thermal shocks". These last expressions mean, in general, a state of internal stress of a material caused by thermal variations that, if sudden, may cause fragile items to break up.

However, it is known that although glass-ceramic materials are high-performance materials, they also have a non-negligible cost and in addition are not adapted to be produced in large sheets.

This means that it is unthinkable to make the entire worktop of a kitchen made of glass-ceramic material. In fact, the current solutions provide for making only the hob with these glass-ceramic materials and instead making the rest of the worktop of a kitchen with synthetic, ceramic or stone materials.

Disadvantageously, the current approach just described has the drawback of creating a discontinuity between the hob itself and the remaining areas belonging to the kitchen top.

Such a drawback may be solved by using stone or ceramic materials, rather than glass-ceramic, also for making the hob.

In fact, the use of ceramic or stone materials as hob would allow obtaining both an aesthetic advantage and a functional advantage.

In particular, from an aesthetic point of view, the worktop of a kitchen with such a solution would not exhibit the above discontinuity between the hob area and the other areas used as simple support spaces. In other words, the worktop of the kitchen with the solution proposed would be seamless and for this reason highly appreciated by lovers of minimalist design.

As regards the functional advantage, it would exist in that, when the heat sources are disabled, the hob may be in turn used as support and work space and thus increase the usability of the kitchen itself and would allow, moreover, greater ease of hygiene and cleaning.

Nevertheless, the main drawback in using hobs made of ceramic or stone materials is their limited resistance to the above "thermal stresses" or "thermal shocks".

However, this drawback is partially overcome by preferring induction coils as heat sources rather than the above gas burners or electric heaters. In fact, during cooking, induction coils allow keeping the temperature of the hob not higher than 70-100° C. with full saucepans and up to 200-250° C. with empty saucepans. In other words, the use of induction coils as heat sources allows reducing the operating temperatures and thereby also limiting thermal shocks.

Still, disadvantageously, combining induction coils as heat sources with a hob made of stone or ceramic material is still not enough to cancel entirely the adverse effects due to the above thermal shocks. In fact, ceramic or stone materials are bad thermal conductors and have a worse thermal expansion compared to glass-ceramic materials, i.e., heat spreads with more difficulty therein, and thus more slowly and furthermore they tend to warp more. In addition, the heating of a saucepan using an induction coil causes a rapid rise in the temperature of the hob at a circumscribed area that lies immediately below the saucepan itself and of course immediately above the induction coil itself. Incidentally, for simplicity and clarity of description, in the present context, such a circumscribed area will be referred to hereinafter by the term "cooking area".

Therefore, since the heat from the cooking area on the hob underneath the saucepan slowly spreads to the bordering areas and at the same time the temperature at such a cooking area increases at a certain rate up to full operation, resulting in an expansion of the material, induced voltages may occur in the transition areas between the cooking area itself and the external areas. In particular, the latter are directly proportional to the change in temperature occurring between the cooking area and the neighbouring areas. The same induced voltages change over time and are the highest at the beginning of the saucepan heating phase to then decrease gradually as the transition area extends horizontally. Disadvantageously, these voltages can cause breakage of the hob along said transition areas, preventing the heat transfer in vertical direction due to the reduced thickness of the hob.

SUMMARY OF THE INVENTION

The present invention aims to overcome all of the above drawbacks.

In particular, the object of the invention is to provide a method for controlling the intensity of heat delivered by one heat source belonging to a cooking apparatus able to prevent or at least minimize the occurrence of local induced voltages on the hob.

Therefore, the object of the invention is to provide a method of controlling such a heat intensity in order to prevent local breakage due to the above induced voltages.

The object of the invention is also to provide a method of controlling such a heat intensity which still allows maintaining a proper cooking speed of the dishes.

Said objects are achieved by the control method according to the main claim.

In particular, the control method of the invention is characterized by calculating the change in the difference between the temperatures detected at a first point and at a second point of the hob over time and reducing the intensity of heat delivered by the heat source if such a change exceeds a predetermined maximum threshold.

Further features of the control method of the invention are described in the dependent claims.

The cooking apparatus configured to carry out the control method steps according to any one of the preceding claims, according to claim 7, is also part of the invention. Further features of the cooking apparatus of the invention are described in the claims depending on claim 7.

BRIEF DESCRIPTION OF THE DRAWINGS

The above objects, along with the advantages that will be mentioned hereinafter, will appear clearly from the description of some preferred embodiment variants of the invention which are made by way of non-limiting example with reference to the accompanying drawings, in which.

DETAILED DESCRIPTION OF THE PREFERRED EMBODIMENTS

Figure 1:
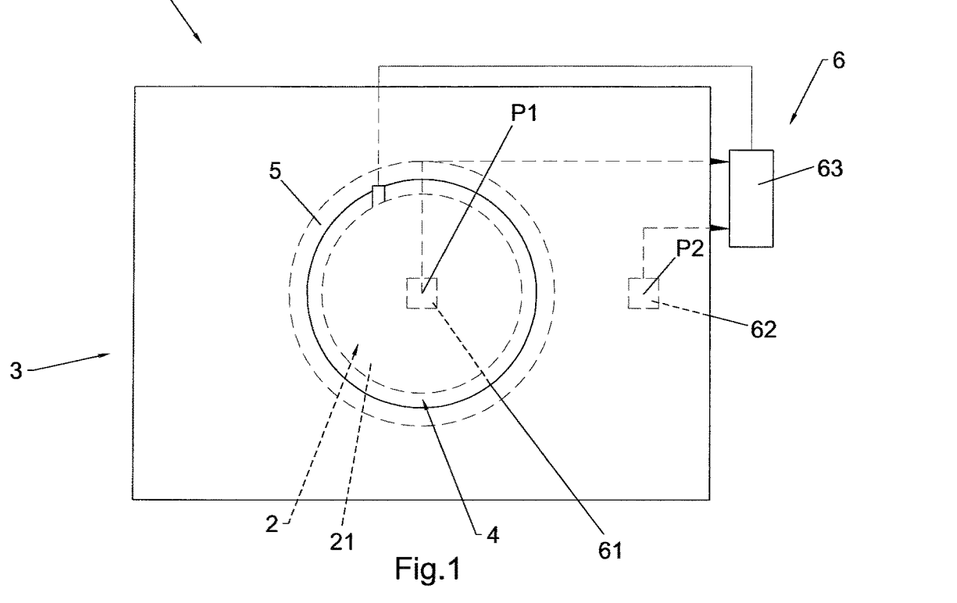
FIG. 1 schematically shows the top view of the cooking apparatus of the invention.
Figure 2:
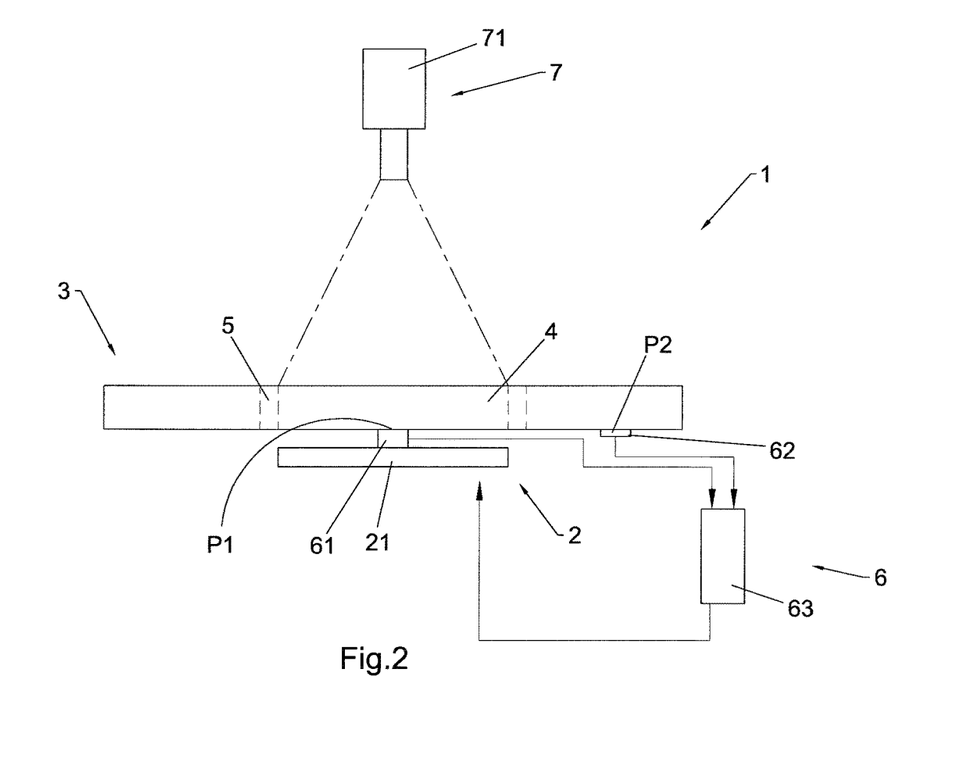
FIG. 2 schematically shows a lateral view of the cooking apparatus of the invention.

The method of the invention, in general, aims to control the intensity of heat delivered by at least one heat source 2 belonging to a cooking apparatus 1 provided with a hob 3, where the heat source 2 is arranged underneath a circumscribed area 4, referred to as cooking area 4, of hob 3 itself, as is schematically shown in FIGS. 1 and 2.

The method of the invention, as noted above, involves calculating the change in the difference between the temperatures detected at a first point $P_1$ and at a second point $P_2$ of hob 3 over time and involves reducing the intensity of heat delivered by the heat source 2 if the above calculated change exceeds a predetermined maximum threshold.

Figure 3:
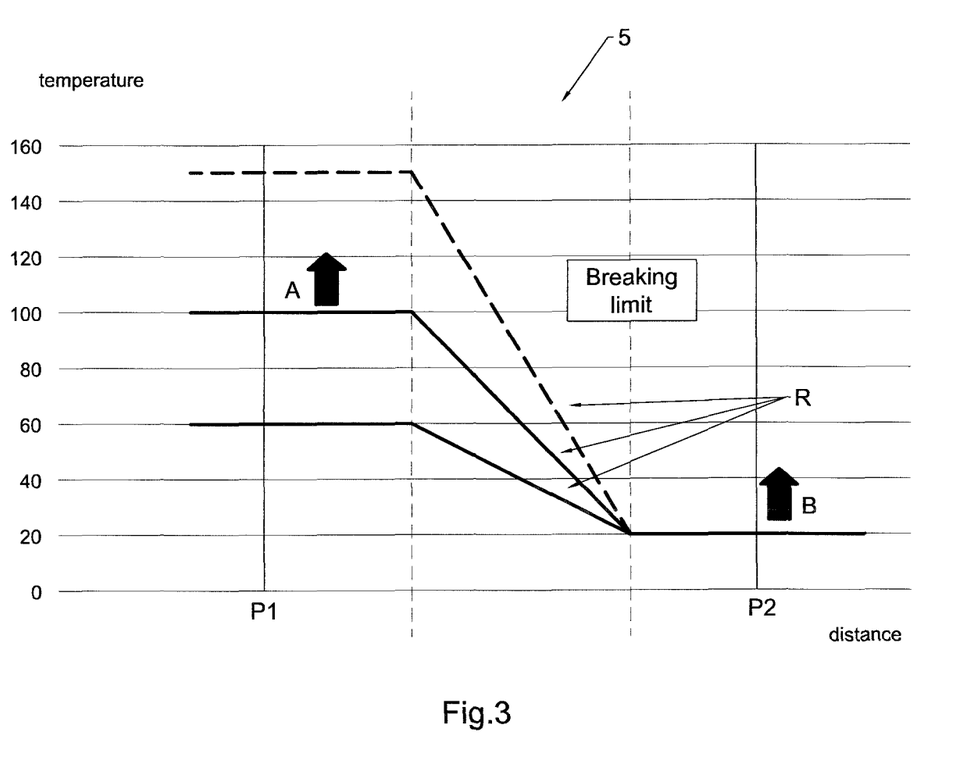
FIG. 3 shows a graph representing the change in temperature at two distinct points of the hob of the cooking apparatus in FIGS. 1 and 2.

In other words, as shown schematically in the graph in FIG. 3, the method of the invention involves checking the inclination of the junction straight line R between the temperature change over time at said first point $P_1$, indicated with arrow A, and the temperature change over time at the second point $P_2$, indicated with arrow B. Then, moreover, the method involves comparing the rate of change of temperatures at both said points $P_1$ and $P_2$. In fact, if such an inclination and therefore such a rate of change exceeds a certain predetermined maximum value, in the transition area 5, interposed between said two points $P_1$ and $P_2$ in hob 3, the above induced voltages may occur which may result in the breakage of the material at the same transition area 5.

In other words, these breakages could occur if the rate at which the temperature changes at the first point $P_1$ is too high compared to the temperature change, in the same time interval, which occurs at the second point $P_2$.

To this end, the method involves keeping said inclination below a certain predetermined value by reducing or zeroing the intensity of heat delivered by the heat source 2.

Clearly, the method of the invention is more effective in preventing the occurrence of such induced voltages in the transition areas 5 when the first point $P_1$ is selected within the above cooking area 4 and the second point $P_2$ is selected outside such cooking area 4.

It is possible, however, that according to alternative embodiments of the invention, the above two points are defined in hob 3 in positions other than those mentioned above, or it is possible more than two points of hob 3 are taken into account in order to carry out the above calculation and comparison.

As will be noted hereinafter, such a calculation and any reduction in the intensity of heat delivered by the heat source 2 are carried out, preferably but not necessarily, cyclically at predetermined and fixed time intervals $\Delta t$.

Figure 4:
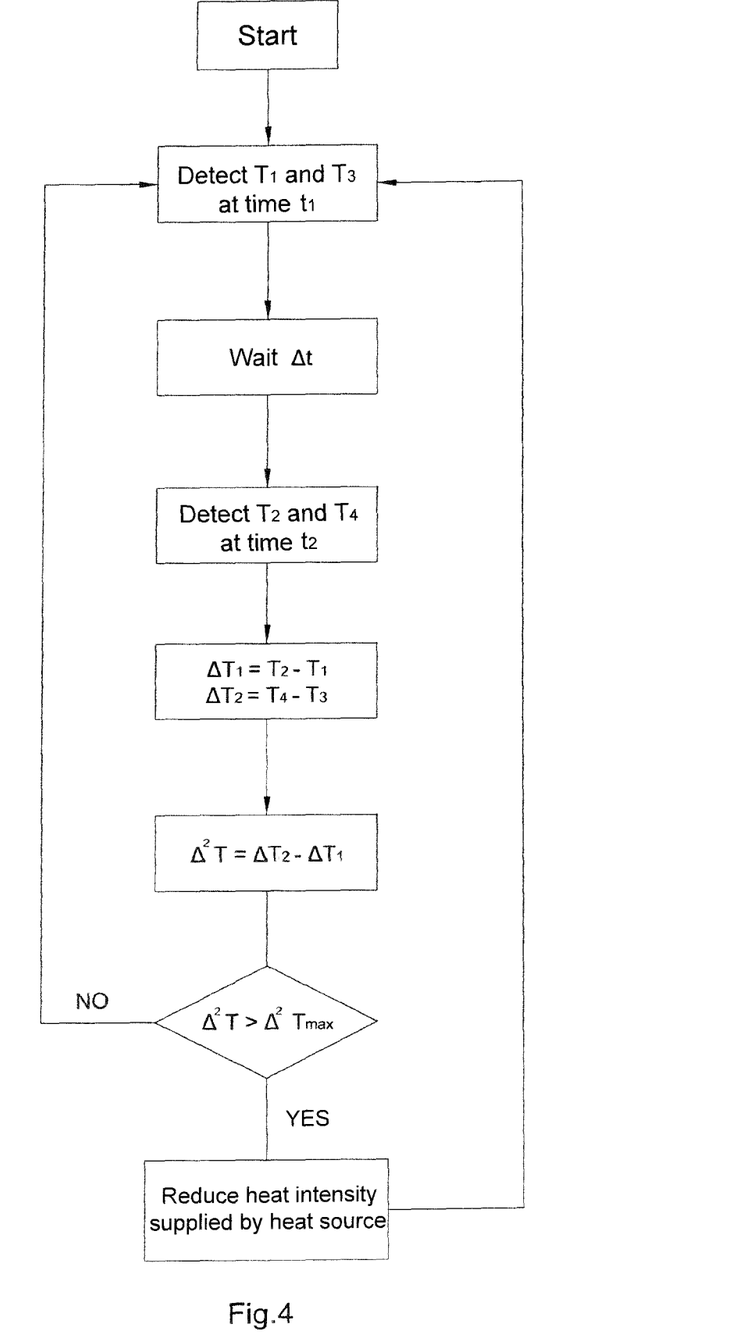
FIG. 4 shows the flow chart of a first preferred embodiment of the control method of the invention.

As regards a first preferred embodiment of the method of the invention, whose flow chart is shown in FIG. 4, the above calculation step involves detecting the temperature value $T_1$ at the first point $P_1$ at a first time instant $t_1$ and detecting the temperature value $T_2$ at the same first point $P_1$ at a second time instant $t_2$. It is also contemplated to detect the temperature value $T_3$ at the second point $P_2$ at the same first time instant $t_1$ and to detect the temperature value $T_4$ again at the second point $P_2$ at said time instant $t_2$.

When the above four temperature values $T_1$, $T_2$, $T_3$ and $T_4$ have been detected, the method of the invention according to the first preferred embodiment provides for calculating the difference $\Delta T_1$ between temperature $T_2$ and temperature $T_1$ and to calculate difference $\Delta T_2$ between temperature $T_4$ and said temperature $T_3$.

In other words, both of said two differences $\Delta T_1$ and $\Delta T_2$ represent the speed at which the temperature changes at point $P_1$ and at point $P_2$, respectively, in said time interval clearly defined as $\Delta t = t_2 - t_1$.

Finally, the method involves calculating the difference $\Delta^2 T$ between said two differences $\Delta T_2$ and $\Delta T_1$ in order to define an index directly proportional to said inclination of the junction straight line R.

As mentioned above, the method then involves comparing such an index with a predetermined maximum threshold value $\Delta^2 T_{max}$ and if such an index exceeds such a maximum threshold $\Delta^2 T_{max}$, the method reduces the intensity of heat delivered by the heat source 2.

If, instead, such an index $\Delta^2 T$ is lower than the predetermined maximum threshold value $\Delta^2 T_{max}$, the control method of the invention provides for keeping the intensity of heat delivered by the heat source 2 unchanged so as to bring the temperature at the first of the two points $P_1$ to full operation. Also, if the index $\Delta^2 T$ is lower than the maximum threshold $\Delta^2 T_{max}$ and such a heat intensity delivered during the previous cycle has been reduced, the method of the invention provides for re-establishing the ideal heat intensity to bring the temperature selected by the user as quickly as possible to speed at the above point $P_1$.

In the most likely situation, for the reasons set out above, in which the heat sources 2 comprise induction coils 21, the method of the invention will clearly check the electrical power supplied to the same coils 21 in order to control the intensity of heat supplied by the latter and transmitted to a saucepan placed on the top.

Figure 5:
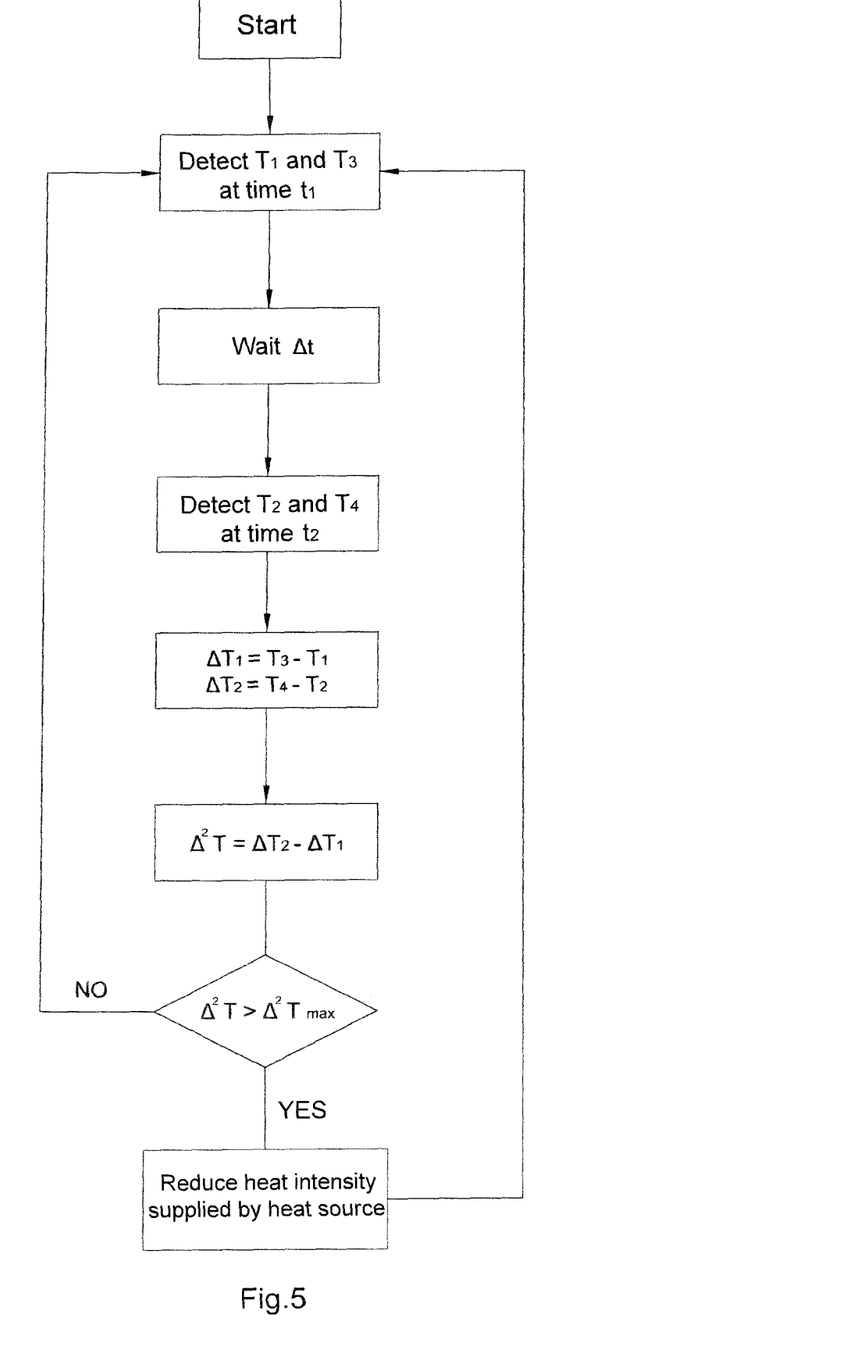
FIG. 5 shows the flow chart of a second preferred embodiment of the control method of the invention.

A second preferred embodiment of the method of the invention, whose flow chart is shown in FIG. 5, alternatively provides, once such four temperature values $T_1$, $T_2$, $T_3$ and $T_4$ have been detected, for calculating difference $\Delta T_1$ between temperature $T_3$ and temperature $T_1$ and for calculating difference $\Delta T_2$ between temperature $T_4$ and temperature $T_2$. Both these values represent the change in temperature that occurs at each of the two points $P_1$ and $P_2$ in two distinct instants of time $t_1$ and $t_2$.

Once values $\Delta T_2$ and $\Delta T_1$ have been obtained, the method provides for calculating their difference $\Delta^2 T = \Delta T_2 - \Delta T_1$. Also in this case, although the sequence of operations described above is different than that of the first embodiment of the invention, the result is the same, i.e., also in this case index $\Delta^2 T$ identified represents the inclination of said junction straight line R. Therefore, also in this case, the sequence of operations described for this second preferred embodiment implements the basic principle of the method of the invention. In particular, $\Delta^2 T$ for both preferred embodiments discussed represents the variation over time of the difference between the temperatures detected at a first point $P_1$ and at a second point $P_2$ of hob 3.

Clearly, the method of the invention, also for the above preferred embodiment, provides for reducing the intensity of the heat delivered by the heat source 2 if difference $\Delta^2 T$ exceeds the above maximum predetermined threshold $\Delta^2 T_{max}$.

In order to make the results obtained from the two embodiments of the method of the invention discussed so far uniform, preferably but not necessarily, difference $\Delta^2 T$ is in both cases calculated as the absolute value between difference $\Delta T_2$ and difference $\Delta T_1$.

Figure 6:
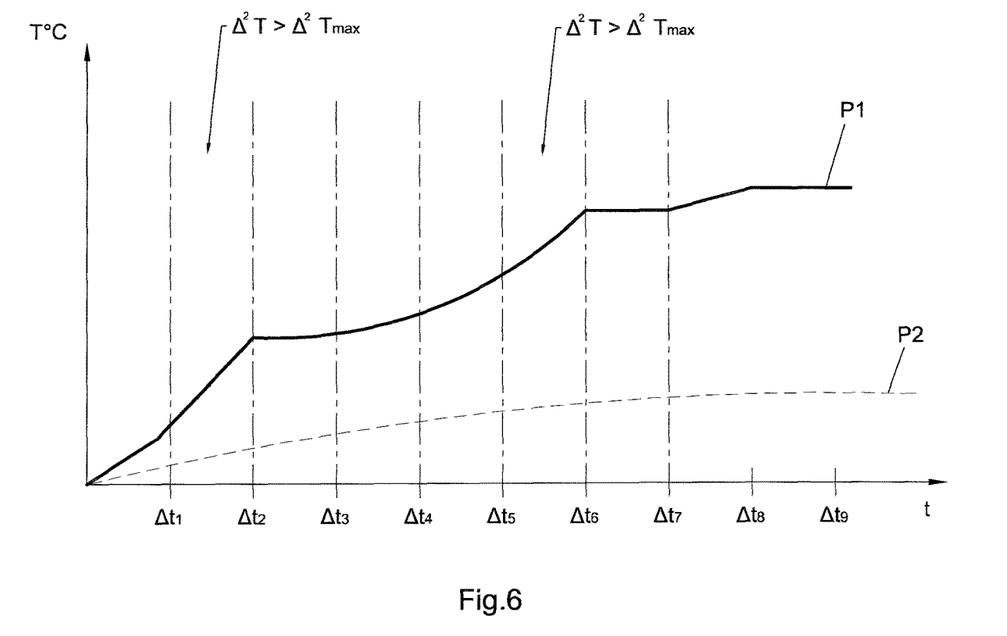
FIG. 6 shows an exemplary graph related to the temperature trends at a first point and at a second point of the hob in FIGS. 1 and 2.

An operating example of the method of the invention is shown in the graph in FIG. 6, in which the abscissa shows the time and the ordinate shows the temperature values of point $P_1$ and point $P_2$, respectively.

As can be seen from the graph, in the time intervals in which value $\Delta^2 T$ is below the maximum predetermined threshold $\Delta^2 T_{max}$, such as for example in $\Delta t_4$ and $\Delta t_5$, the method of the invention provides for keeping the electrical power supplied to the induction coils 21 constant so that temperature at point $P_1$ continue to increase regularly up to full operation.

At the instants when, instead, such a value $\Delta^2 T$ is higher than the maximum threshold value $\Delta^2 T_{max}$, such as in $\Delta t_2$ and $\Delta t_6$, the electrical power supplied to the same induction coils 21 is reduced and therefore the temperature at point $P_1$ in the time interval immediately following ($\Delta t_3$ and $\Delta t_7$) tends to remain constant at the same value reached up to that moment, so as to prevent the onset of the above induced voltages.

Of course, as said above, when $\Delta^2 T$ is within the predetermined parameters, the method of the invention provides for supplying an adequate electric power to the induction coils 21 in order to achieve the temperature value selected by the user at point $P_1$ as quickly as possible.

Another advantage obtained by the method of the invention, in particular because it performs the comparison, over time, of temperature values at two different points $P_1$ and $P_2$ of hob 3 is to prevent the onset of induced voltages in transitional areas 5 between the above two points $P_1$ and $P_2$ without at the same time setting a maximum limit on the absolute temperature value which can be reached in one of the two above points $P_1$ and $P_2$.

As mentioned above, the cooking apparatus 1 is also part of the invention, provided with a hob 3 and a heat source 2 arranged underneath a circumscribed area of hob 3, defined as cooking area 4, as shown schematically in FIGS. 1 and 2.

Preferably, the heat source 2 is an induction coil 21.

It is not excluded that, according to different embodiments of the invention, the cooking apparatus 1 includes more than one heat source 2.

Moreover, it is not excluded that according to alternative embodiments, the heat source(s) 2 may be of a different nature than the induction coil 21, such as a gas burner or an electrical resistance.

As for hob 3, it is preferably but not necessarily made of stone material or ceramic material.

It is not excluded, however, that a different material of known type may be selected for producing such a hob 3.

According to the invention, such a cooking apparatus 1 comprises an electronic control unit 6 configured to implement the steps of the above control method as described above.

In particular, the preferred embodiment of the invention provides for the electronic control unit 6 to include a first temperature sensor 61 arranged underneath hob 3 within the cooking area 4. In this way, the first temperature sensor 61 is able to detect the temperature of hob 3 at the cooking area 4 on which a saucepan is placed and is heated by the induction coil 21.

Moreover, the electronic control unit 6 also includes a second temperature sensor 62 arranged underneath hob 3 at an area external to such a cooking area 4. In this case, the second temperature sensor 62 is able to detect the temperature of hob 3 in a point external to such cooking area 4 heated by diffusion of the heat generated at the same cooking area 4.

Finally, the electronic control unit 6 is provided with an electronic control unit 63 operatively associated with the first and second temperature sensor 61 and 62 and with the same heat source 2. Such an electronic control unit 63 is configured to perform the above steps of the method just described.

Finally, the preferred embodiment of the cooking apparatus 1 of the invention also comprises light radiation emission means 7 arranged above hob 3 and adapted to project a beam of light at said cooking area 4. According to this preferred embodiment, the electronic control unit 6 is operatively associated with said light radiation emission means 7 and is configured to activate the latter when the heat source 2 is active. In this way, the light radiation emission means 7 illuminate the cooking area 4 when the heat source 2, arranged underneath, can generate heat and heat a saucepan. Therefore, the presence of such light radiation emission means 7 advantageously allows a user to know when a heat source 2 is on or off, which would otherwise be understood visually in presence of hobs made of ceramic or stone materials, as they are not transparent like glass ceramics.

According to the preferred embodiment of the cooking apparatus 1 of the invention, said light radiation emission means 7 are configured to project the edge of the cooking area 4, preferably circular or elliptical in shape, on hob 3.

It is not excluded, however, that according to alternative embodiments of the invention, such light radiation emission means 7 are configured to project the edges of the cooking area 4 with geometric shapes other than circular or elliptical.

Moreover, according to different embodiments of the cooking apparatus 1 of the invention, it is not excluded that such light radiation emission means 7 are configured to project solid geometric shapes, and not just their edges, on hob 3.

As regards again the preferred embodiment of the invention, the electronic control unit 6 is configured to control the intensity variation of the light radiation emitted by the light radiation emission means 7 in direct proportion to the variation in the heat intensity delivered by the heat source 2.

In other words, in the case of heat sources 2 comprising induction coils 21, the higher the electrical power supplied to said coils 21 and the more intense the light radiations projected on said hob 3. Alternatively, it may be contemplated to vary the color of said light radiations rather than their intensity, provided that such change is implemented at the variation in the heat intensity delivered by the heat source 2. Moreover, according to a different embodiment, it may be contemplated to vary both the intensity and the color of such light radiation emitted by the light radiation emission means 7.

Moreover, according to the preferred embodiment of the invention, such light radiation emission means 7 are configured to project on said hob 3, outside the cooking area 4, the controls available to the user and the temperature data of the saucepan and of the cooking area 4 and the electrical power supplied to the induction coil 21.

Preferably, the light radiation emission means 7 include a light projector 71.

It is not excluded that, according to a different embodiment of the invention, the cooking apparatus 1 comprises the above light radiation emission means 7 without, however, being configured to perform the steps of the control method of the invention, described above.

Based on the above, therefore, the control method and the cooking apparatus of the invention achieve all the intended objects.

In particular, the object of providing a method for controlling the intensity of heat delivered by one heat source belonging to a cooking apparatus so as to prevent or at least minimize the occurrence of local induced voltages on the hob is achieved.

Also the object of providing a method of controlling such a heat intensity in order to prevent local breakage due to the above induced voltages is achieved.

Finally, it is an object of the invention to provide a method of controlling such a heat intensity which still allows maintaining a proper cooking speed of the dishes.

The invention claimed is:

1. A method for controlling the intensity of heat delivered by at least one heat source belonging to a cooking apparatus provided with a hob, said heat source being arranged underneath a circumscribed cooking area of said hob, said method comprising the following steps:
   calculating the variation over time in the difference between the temperatures detected in a first point $P_1$ and in a second point $P_2$ of said hob;
   reducing said heat intensity delivered by said heat source if such variation exceeds a predetermined maximum threshold $\Delta^2 T_{max}$.

2. The method according to claim 1, wherein said first point $P_1$ is defined within said cooking area and said second point $P_2$ is defined outside said cooking area.

3. The method according to claim 1, wherein said calculation step includes:
   detecting the temperature value $T_1$ at said first point $P_1$ at a first time instant $t^1$ and detecting the temperature value $T_2$ at said first point $P_1$ at a second time instant $t_2$;
   detecting the temperature value $T_3$ at said second point $P_2$ at said first time instant $t_1$ and detecting the temperature value $T_4$ at said second point $P_2$ at said second time instant $t_2$;
   calculating difference $\Delta T_1$ between said temperature $T_2$ and said temperature $T_1$;
   calculating difference $\Delta T_2$ between said temperature $T_4$ and said temperature $T_3$;
   calculating difference $\Delta^2 T$ between said difference $\Delta T_2$ and said difference $\Delta T_1$;
   and in that said step of reducing said heat intensity is carried out if said difference $\Delta^2 T$ exceeds said maximum predetermined threshold $\Delta^2 T_{max}$.

4. The method according to claim 3, wherein the time interval $\Delta t$ between said time instants $t_1$ and $t_2$ takes a predefined and fixed value.

5. The method according to claim 3, wherein said difference $\Delta^2 T$ is calculated as the absolute value between said difference $\Delta T_2$ and said difference $\Delta T_1$.

6. The method according to claim 1, wherein said calculation step includes:
   detecting the temperature value $T_1$ at said first point $P_1$ at a first time instant $t_1$ and detecting the temperature value $T_2$ at said first point $P_1$ at a second time instant $t_2$;
   detecting the temperature value $T_3$ at said second point $P_2$ at said first time instant $t_1$ and the temperature value $T_4$ at said second point $P_2$ at said second time instant $t_2$;
   calculating difference $\Delta T_1$ between said temperature $T_3$ and said temperature $T_1$;
   calculating difference $\Delta T_2$ between said temperature $T_4$ and said temperature $T_2$;
   calculating difference $\Delta^2 T$ between said difference $\Delta T_2$ and said difference $\Delta T_1$;
   and in that said step of reducing said heat intensity is carried out if said difference $\Delta^2 T$ exceeds said maximum predetermined threshold $\Delta^2 T_{max}$.

7. A cooking apparatus provided with a hob and at least one heat source arranged underneath a circumscribed cooking area of said hob, wherein the cooking apparatus comprises an electronic control unit configured to implement steps of controlling a heat intensity delivered by said at least one heat source to said hob, said steps of controlling comprising:
   calculating a variation over time in a difference between temperatures detected in a first point $P_1$ and in a second point $P_2$ of said hob; and
   reducing said heat intensity delivered by said heat source if such variation exceeds a predetermined maximum threshold $\Delta^2 T_{max}$.

8. The cooking apparatus according to claim 7, wherein said electronic control unit comprises:
   at least a first temperature sensor arranged underneath said hob within said cooking area;
   at least a second temperature sensor arranged underneath said hob outside said cooking area;
   an electronic control unit operatively associated with said first and second temperature sensors and with said heat source, said electronic control unit being configured to perform the following steps:
   calculating the variation over time in the difference between the temperatures detected in a first point $P_1$ and in a second point $P_2$ of said hob;
   reducing said heat intensity delivered by said heat source if such variation exceeds a predetermined maximum threshold $\Delta^2 T_{max}$.

9. The cooking apparatus according to claim 7, wherein said at least one heat source is an induction coil.

10. The cooking apparatus according to claim 7, wherein said hob is made of stone material or ceramic material.

11. The cooking apparatus according to claim 7, further comprising light radiation emission means arranged above said hob and adapted to project a beam of light on said cooking area, said electronic control unit being operatively associated with said light radiation emission means and being configured to activate said light radiation emission means when said heat source is active.

12. The cooking apparatus according to claim 11, wherein said electronic control unit is configured to vary the intensity and/or color of the light radiation emitted by said light radiation emission means in direct proportion to the variation in the heat intensity supplied by at least one heat source.

\* \* \* \* \*